(12) United States Patent
Kolehmainen

(10) Patent No.: US 9,577,481 B2
(45) Date of Patent: Feb. 21, 2017

(54) ROTOR FOR AN ELECTRIC MACHINE AND ELECTRIC MACHINE INCLUDING THE SAME

(71) Applicant: ABB Technology AG, Zurich (CH)

(72) Inventor: Jere Kolehmainen, Vaasa (FI)

(73) Assignee: ABB Schweiz AG, Baden (CH)

( * ) Notice: Subject to any disclaimer, the term of this patent is extended or adjusted under 35 U.S.C. 154(b) by 26 days.

(21) Appl. No.: 14/790,648

(22) Filed: Jul. 2, 2015

(65) Prior Publication Data
US 2015/0303748 A1    Oct. 22, 2015

Related U.S. Application Data

(63) Continuation of application No. PCT/EP2014/050008, filed on Jan. 2, 2014.

(30) Foreign Application Priority Data

Jan. 3, 2013    (EP) ..................................... 13150103

(51) Int. Cl.
*H02K 1/24*    (2006.01)
*H02K 1/27*    (2006.01)

(52) U.S. Cl.
CPC .............. *H02K 1/246* (2013.01); *H02K 1/276* (2013.01)

(58) Field of Classification Search
CPC ....... H02K 1/246; H02K 1/276; H02K 1/2766
See application file for complete search history.

(56) References Cited

U.S. PATENT DOCUMENTS 5,369,325 A * 11/1994 Nagate ................ H02K 1/2746
   310/156.54
5,864,191 A *  1/1999 Nagate .................. H02K 1/276
   310/156.53

(Continued)

FOREIGN PATENT DOCUMENTS

CN    1388625 A    1/2003
CN    1741354 A    3/2006

(Continued)

OTHER PUBLICATIONS

International Search Report (PCT/ISA/210) mailed on Feb. 21, 2014, by the European Patent Office as the International Searching Authority for International Application No. PCT/EP2014/050008.

(Continued)

*Primary Examiner* — Naishadh Desai
(74) *Attorney, Agent, or Firm* — Taft Stettinius & Hollister LLP

(57) ABSTRACT

A rotor as disclosed for an electric machine which includes a rotor core having a plurality of rotor sheets stacked in an axial direction, each of the plurality of rotor sheets having a plurality of flux paths made of a material of high permeance, a plurality of flux barriers made of a material of low permeance, a plurality of bridges made of a material of high permeance, each of the plurality of bridges extending across a corresponding flux barrier, and at least one axial magnet located axially adjacent a corresponding bridge and configured to saturate the corresponding bridge, each axial magnet being axially pressed between two elements at least one of which is a bridge corresponding to the axial magnet.

17 Claims, 5 Drawing Sheets

(56) References Cited

U.S. PATENT DOCUMENTS

| | | | | |
|---|---|---|---|---|
| 6,121,706 | A * | 9/2000 | Nashiki | H02K 1/246 310/152 |
| 6,657,347 | B2 * | 12/2003 | Pfetzer | H02K 1/278 310/156.01 |
| 7,365,466 | B2 * | 4/2008 | Weihrauch | H02K 1/276 310/156.78 |
| 9,118,230 | B2 * | 8/2015 | Jurkovic | H02K 1/2766 |
| 2003/0020351 | A1 * | 1/2003 | Lee | H02K 1/246 310/156.53 |
| 2009/0224624 | A1 * | 9/2009 | Kumar | H02K 1/276 310/156.53 |
| 2009/0230803 | A1 * | 9/2009 | Nakayama | H02K 1/2766 310/156.56 |
| 2011/0198959 | A1 * | 8/2011 | Vyas | H02K 1/2766 310/156.21 |
| 2012/0074801 | A1 * | 3/2012 | Brown | H02K 1/32 310/59 |
| 2012/0091845 | A1 * | 4/2012 | Takemoto | H02K 1/276 310/156.01 |

FOREIGN PATENT DOCUMENTS

| | | |
|---|---|---|
| CN | 1889326 A | 1/2007 |
| EP | 2 744 076 A1 | 6/2014 |

OTHER PUBLICATIONS

Written Opinion (PCT/ISA/237) mailed on Feb. 21, 2014, by the European Patent Office as the International Searching Authority for International Application No. PCT/EP2014/050008.

European Search Report mailed on Jul. 17, 2013 for Application No. 13150103.3.

English Translation of Chinese Office Action dated Nov. 2, 2016; State Intellectual Property Office of People's Republic of China; Chinese Application No. 201480003859.6; Applicant: ABB Technology AG; 7 pgs.

* cited by examiner

ROTOR FOR AN ELECTRIC MACHINE AND ELECTRIC MACHINE INCLUDING THE SAME

RELATED APPLICATION(S)

This application claims priority as a continuation application under 35 U.S.C. §120 to PCT/EP2014/050008, which was filed as an International Application on Jan. 2, 2014 designating the U.S., and which claims priority to European Application 13150103.3 filed in Europe on Jan. 3, 2013. The entire contents of these applications are hereby incorporated by reference in their entireties.

FIELD

The present disclosure relates to a rotor for an electric machine. The present disclosure also relates to an electric machine including said rotor.

BACKGROUND INFORMATION

In an electric machine rotor provided with a plural number of magnetic poles, arranged substantially at equal intervals along the circumference of the rotor, each magnetic pole has a direct pole axis, or a direct axis. Two adjacent direct pole axes form an angle that is bisected by a quadrature axis. The reactance corresponding to the direct pole axis is called a direct-axis reactance and the reactance corresponding to the quadrature axis a quadrature-axis reactance. A reluctance torque is proportional to difference of inverse values of the quadrature-axis reactance and the direct-axis reactance, which difference can be written as $1/X_q - 1/X_d$. Therefore a reluctance torque can be increased by increasing the direct-axis reactance or by reducing the quadrature-axis reactance.

A known rotor of a reluctance machine includes a rotor core having a plurality of flux guide sections located along circumferential direction of the rotor core, each of the plurality of flux guide sections including a plurality of flux paths made of a material of high permeance and a plurality of flux barriers made of a material of low permeance. The flux paths and flux barriers are located alternately along radial direction of the flux guide section. For mechanical reasons there are bridges made of a material of high permeance connecting adjacent flux paths.

The bridges cause leak flux from one flux path to another. The leak flux decreases efficiency and maximum torque and increases no-load current thereby deteriorating electrical properties of the electric machine. Therefore minimizing leak flux in bridges improves electrical properties of the electric machine.

SUMMARY

A rotor is disclosed for an electric machine including a rotor core having a plurality of flux guide sections located along a circumferential direction of the rotor core, each of the plurality of flux guide sections establishing a plurality of flux paths made of a material of high permeance and a plurality of flux barriers made of a material of low permeance located alternately along a radial direction of the flux guide section, each of the plurality of flux barriers extending from a first extremity to a second extremity, the first and the second extremities being situated adjacent a surface of the rotor core and being spaced apart from one another in a circumferential direction, each of the plurality of flux barriers defining a corresponding imaginary centre line extending from a first point on a rotor surface to a second point on a rotor surface, the first point and the second point being spaced apart from one another at the rotor surface in a circumferential direction of the rotor, the rotor core including a plurality of bridges made of a material of high permeance, each of the plurality of bridges extending across a corresponding flux barrier, a plurality of permanent magnets, each one of which is located adjacent a corresponding bridge and configured to saturate the corresponding bridge, a magnetization direction of each of the plurality of permanent magnets diverging from a direction in which the corresponding bridge extends across the flux barrier and a plurality of rotor sheets having stacked in an axial direction, each of the plurality of rotor sheets comprising a plurality of flux guide sections located along a circumferential direction of the rotor sheet, the plurality of flux guide sections of the rotor core being formed by the plurality of flux guide sections of the stacked rotor sheets, and the plurality of permanent magnets include at least one axial magnet located axially adjacent a corresponding bridge, each axial magnet being axially pressed between two elements at least one of which is a bridge corresponding to the axial magnet.

BRIEF DESCRIPTION OF THE DRAWINGS

In the following, features disclosed herein will be described in greater detail by ways of preferred exemplary embodiments with reference to the attached drawings, in which.

DETAILED DESCRIPTION

As disclosed herein, improved electrical properties can be achieved in an electric machine whose rotor includes bridges connecting adjacent flux paths.

Exemplary embodiments include a rotor core with a plurality of permanent magnets each one of which is located axially adjacent a corresponding bridge and adapted configured, (i.e., adapted) to saturate the corresponding bridge.

An exemplary advantage of disclosed embodiments is that electrical properties of an electric machine whose rotor includes bridges connecting adjacent flux paths can be improved.

European Patent application 12197147.7 discloses electrical properties of an electric machine having a rotor with stacked rotor sheets. Exemplary embodiments can for example, be disclosed herein exploited together with such a configuration of the European patent, wherein permanent magnets are placed adjacent bridges of the rotor sheets disclosed in the European patent.

Figure 1:
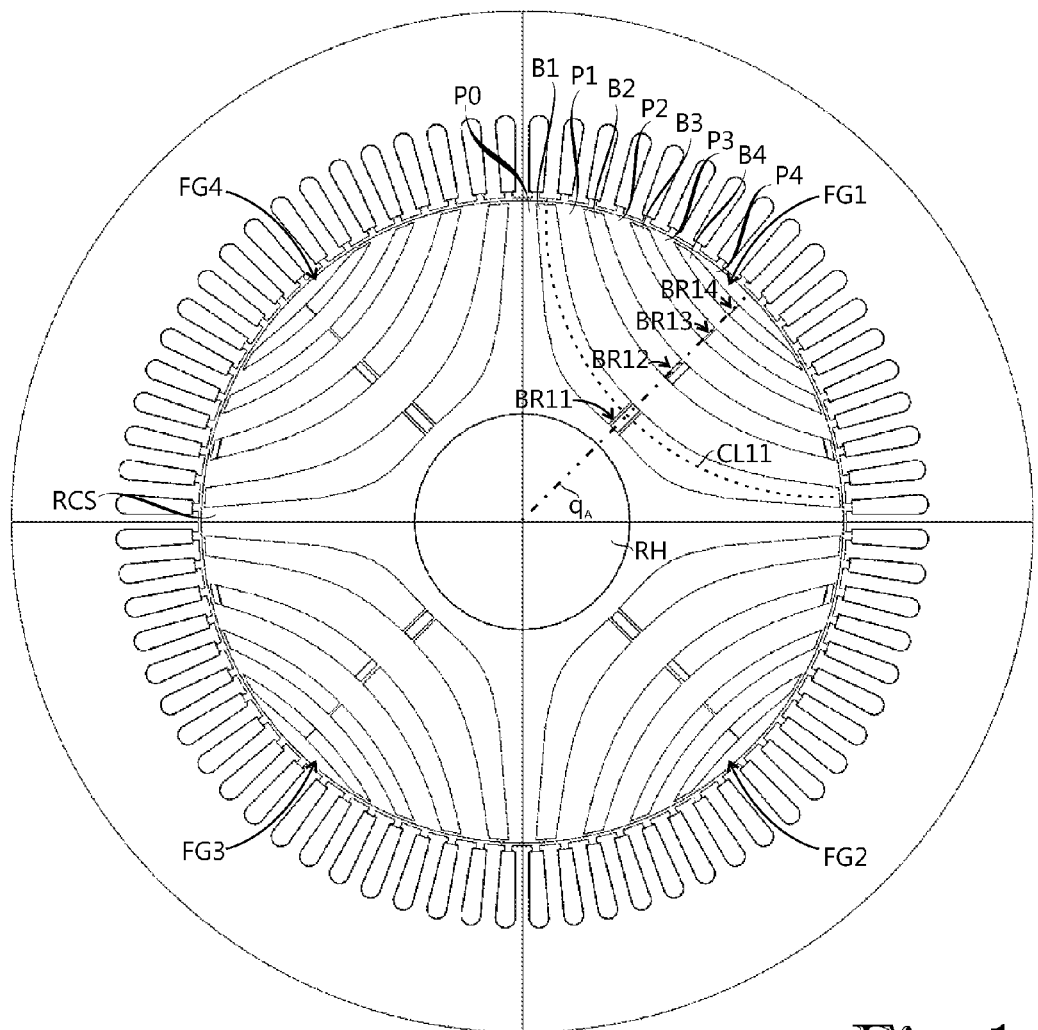
FIG. 1 shows a cross section of a known electric machine.

FIG. 1 shows a cross section of known electric machine. The electric machine includes a rotor and a stator. The rotor includes a rotor core having flux guide sections FG1, FG2, FG3 and FG4 located along circumferential direction of the rotor core. Herein a circumferential direction is a curved direction which is perpendicular to axial direction and radial direction of the rotor.

Each of the flux guide sections FG1-FG4 can include flux paths P1, P2, P3 and P4 made of a material of high permeance and flux barriers B1, B2, B3 and B4 made of a material of low permeance located alternately along radial direction of the flux guide section. Each of flux barriers B1-B4 extends from a first extremity to a second extremity, the first and the second extremities being situated adjacent surface of the rotor core and being spaced apart from one another in a circumferential direction. Each flux barrier B1-B4 is arranged to provide a high magnetic resistance between adjacent elements made of a material of high permeance.

Each of the flux barriers B1-B4 defines a corresponding imaginary centre line extending from a first point on a rotor surface to a second point on the rotor surface, the first point and the second point being spaced apart from one another at the rotor surface in a circumferential direction of the rotor. In FIG. 1 an imaginary centre line of flux barrier B1 of flux guide sections FG1 has been illustrated by a dash line CL11.

Flux paths P1-P4 are arranged to conduct magnetic flux from a first extremity of the flux path to a second extremity thereof, both the first extremity and the second extremity being situated at the rotor surface and being spaced apart from one another at the rotor surface in a circumferential direction of the rotor. Flux paths P1-P3 are shaped in such a way that the circumferential extremities, (e.g., those above referred to as the first and the second extremity), are at a substantially greater radial distance from the mid-axis of the rotor than an outer surface of a centre portion of the flux path in question.

The rotor core can include bridges BR11, BR12, BR13 and BR14 made of a material of high permeance, each of the bridges BR11-BR14 extending across a corresponding flux barrier. Bridge BR11 extends across flux barrier B1, bridge BR12 extends across flux barrier B2, bridge BR13 extends across flux barrier B3, and bridge BR14 extends across flux barrier B4.

The rotor of FIG. 1 can include a centre section RCS. The centre section RCS is substantially X-shaped, with each tip of the X extending to the surface of the rotor. The direct pole axis of each magnetic pole passes through the portion of the centre section RCS that extends to the rotor surface. In the middle of the centre section RCS there is a hole RH arranged to receive a rotor shaft.

The centre section RCS is made of material of high permeance. Therefore the centre section RCS forms a centre flux path P0 for each flux guide section. Each centre flux path P0 is located adjacent a respective flux barrier B1, and is arranged to conduct magnetic flux from a first extremity of the centre flux path to a second extremity thereof, both the first extremity and the second extremity being situated at the rotor surface.

Figure 2:
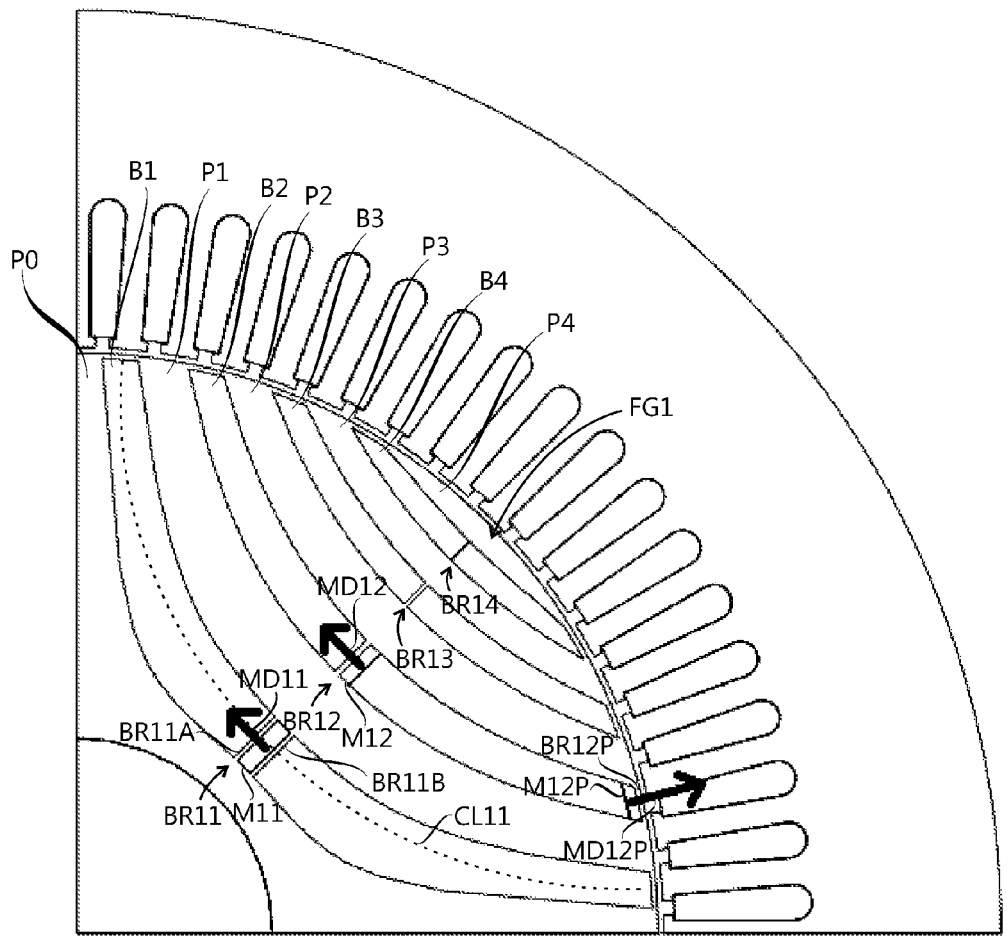
FIG. 2 shows an enlarged detail of a cross section of FIG. 1.

FIG. 2 shows a quarter of the cross section of FIG. 1 as an enlargement. FIG. 2 shows that the rotor core includes permanent magnets M11, M12 and M12P each one of which is located adjacent a corresponding bridge and configured (e.g., adapted) to saturate the corresponding bridge. A reluctance of a saturated bridge is higher than a reluctance of an unsaturated bridge. Permanent magnet M11 is located adjacent bridge BR11, permanent magnet M12 is located adjacent bridge BR12, and permanent magnet M12P is located adjacent bridge BR12P. Magnetization direction of permanent magnet M11 is denoted with arrow MD11, magnetization direction of permanent magnet M12 is denoted with arrow MD12, and magnetization direction of permanent magnet M12P is denoted with arrow MD12P. A magnetization direction of each of the permanent magnets M11, M12 and M12P is substantially perpendicular to a direction in which corresponding bridge extends across associated flux barrier.

Herein a magnetization direction of a magnet is a direction parallel to a line extending from a south pole of the magnet to a north pole of the magnet. Thus, the magnetization direction is defined to be parallel to a general direction of a magnetic field inside the magnet. The magnetization direction defined here is rectilinear also outside the magnet despite the fact that outside a magnet a magnetic field thereof extends from a north pole to a south pole and therefore the magnetic field has a curvilinear form.

In alternative embodiments a magnetization direction of each permanent magnet diverges from a direction in which the corresponding bridge extends across the flux barrier without being substantially perpendicular to the direction in which the corresponding bridge extends across the associated flux barrier. In an embodiment a magnetization direction of each permanent magnet diverges from a direction in which the corresponding bridge extends across the flux barrier by an angle greater than 45°.

A total volume of a permanent magnet corresponding to a bridge is not more than five times a volume of the bridge. In an exemplary embodiment, a total volume of each permanent magnet is one to two times a volume of the corresponding bridge. In alternative embodiments at least one permanent magnet may comprise a plurality of partial magnets wherein a total volume of such permanent magnet is the total volume of the partial magnets.

Permanent magnets are relatively small compared to associated flux barriers. Each flux barrier across which there extends at least one bridge having an associated permanent magnet has a length along the corresponding imaginary centre line which is multiple compared to a total length of said associated permanent magnet along the corresponding imaginary centre line. Length of bridges and permanent magnets is not included in a length of the flux barrier. In an embodiment each flux barrier across which there extends at least one bridge having an associated permanent magnet has a length along the corresponding centre line which is at least ten times a total length of said associated permanent magnet along the corresponding centre line. For example flux barrier B1 across which there extends bridge BR11 has a length along imaginary centre line CL11 which is tens of times a total length of permanent magnet M11 along the imaginary centre line CL11.

Permanent magnets M11, M12 and M12P are lateral magnets each one of which is located adjacent a corresponding bridge in a lateral direction perpendicular to the axial direction of the rotor. Permanent magnet M11 is located adjacent bridge BR11, permanent magnet M12 is located adjacent bridge BR12, and permanent magnet M12P is located adjacent bridge BR12P. Permanent magnet M12P is located radially inward with respect the bridge BR12P. Each lateral magnet M11, M12 and M12P is located along an imaginary centre line of corresponding flux barrier. Imaginary centre line CL11 of flux barrier B1 passes through permanent magnet M11, and imaginary centre line of flux barrier B2 passes through permanent magnets M12 and M12P.

Permanent magnet M12 is located clockwise with relation to the adjacent bridge BR12. Also a corresponding permanent magnet in flux guide section FG3 is located clockwise with relation to the adjacent bridge. Corresponding permanent magnets in flux guide sections FG2 and FG4 are located anticlockwise with relation to the adjacent bridge. Herein directions clockwise and anticlockwise refer to FIGS. 1 and 2.

Bridge BR11 is a split bridge which includes a first bridge side wall BR11A and a second bridge side wall BR11B spaced apart in direction of the imaginary centre line CL11 of flux barrier B1, the first bridge side wall BR11A and the second bridge side wall BR11B accommodating lateral magnet M11 between them. A volume of a split bridge is a sum of volumes of its side walls.

Bridges BR11, BR12, BR13 and BR14 are intermediate bridges each one of which interrupts corresponding flux barrier. Further, bridges BR11, BR12, BR13 and BR14 are quadrature axis bridges, each being positioned such that a quadrature axis of the rotor traverses the quadrature axis bridge. Quadrature axis passing through flux guide section FG1 has been denoted with reference mark $q_4$ in FIG. 1. In the split bridge BR11 the quadrature axis passes between the first bridge side wall BR11A and the second bridge side wall BR11B.

Bridge BR12P is a peripheral bridge traversing corresponding flux barrier B2 at an outer end thereof. It should be noticed that each flux barrier of the rotor core of FIG. 1 includes a peripheral bridge at both ends thereof. Each peripheral bridge is made of a material of high permeance. Due to the peripheral bridges there is an unbroken ring made of a material of high permeance extending around the rotor core. The unbroken ring strengthens the structure of the rotor core. Only peripheral bridge BR12P is denoted with a reference mark.

Figure 3:
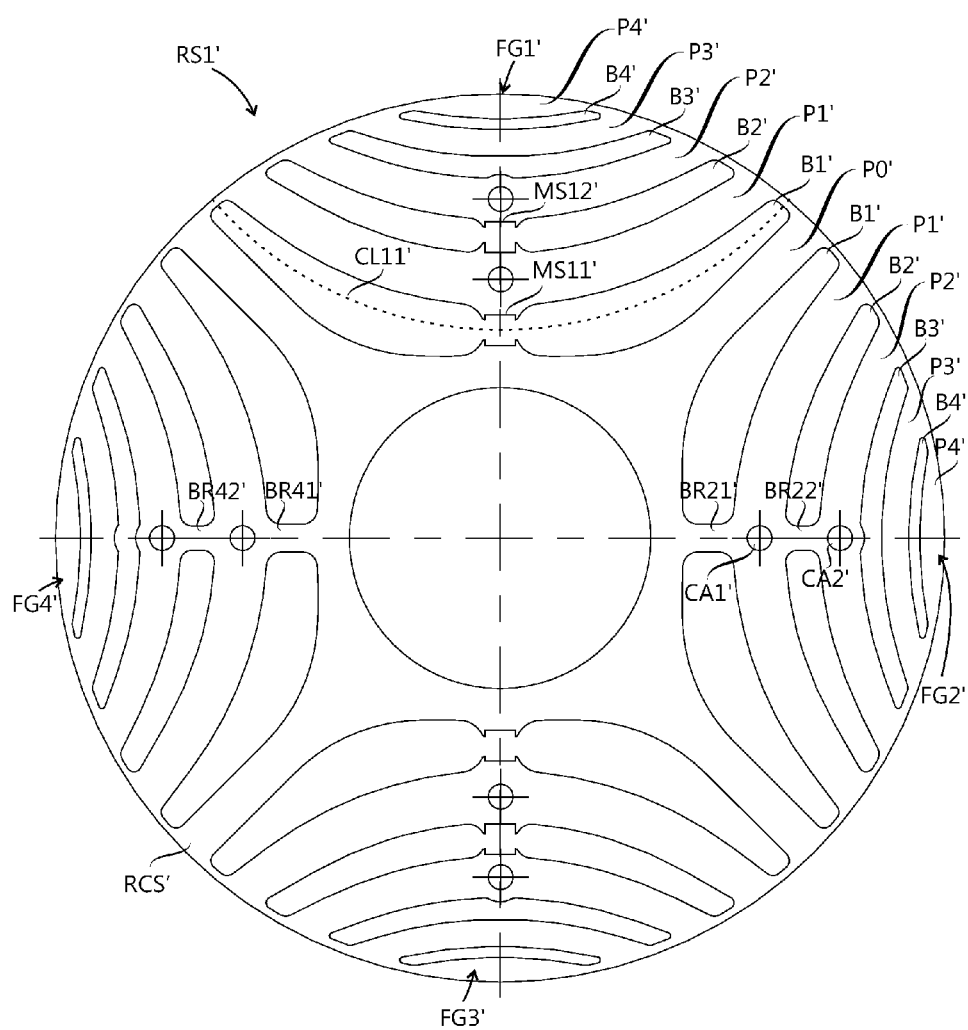
FIG. 3 shows a rotor sheet of a rotor according to an exemplary embodiment of the disclosed herein.
Figure 4:
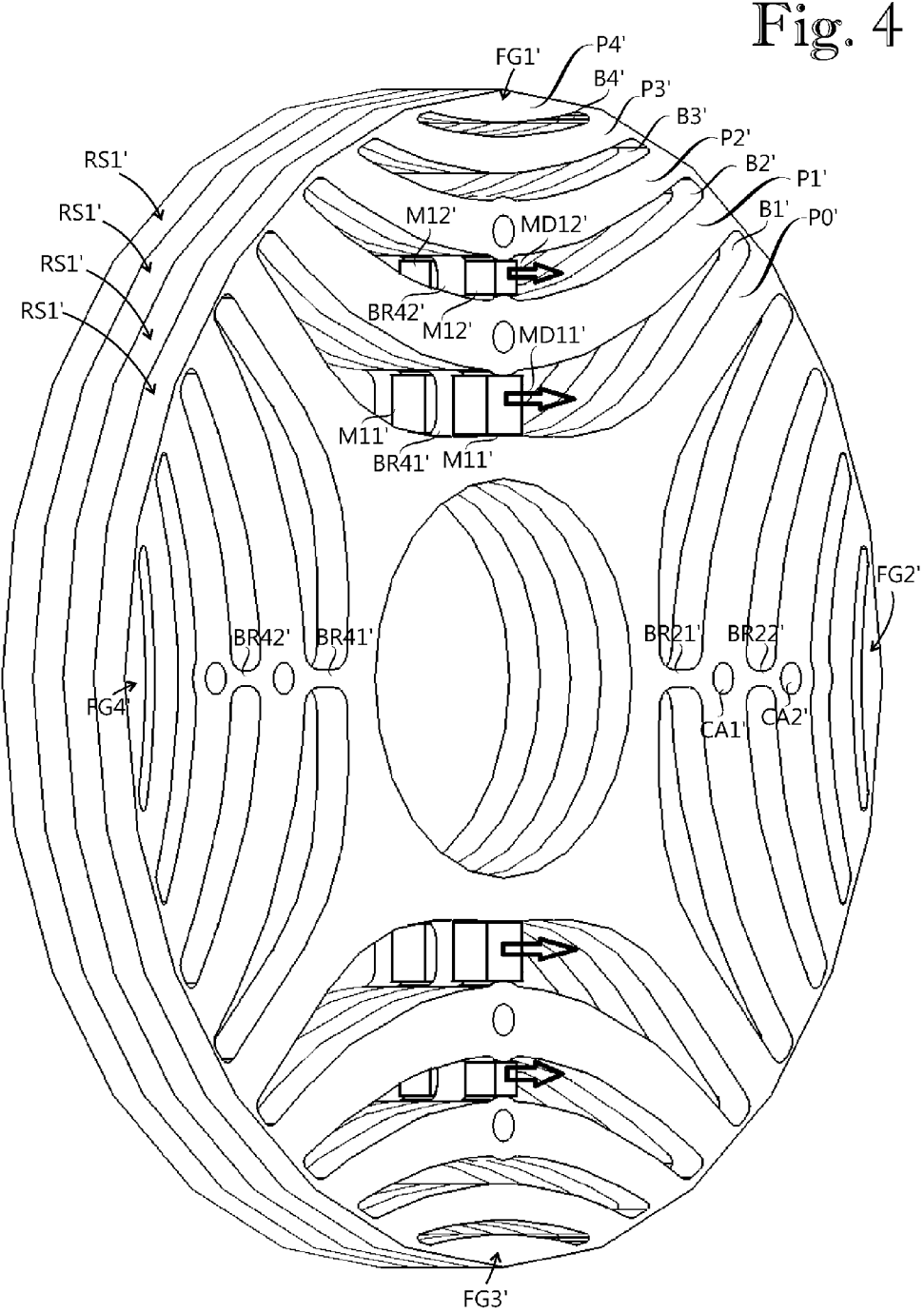
FIG. 4 shows four exemplary rotor sheets axially stacked, each of the rotor sheets being similar to the rotor sheet of FIG. 3.
Figure 5:
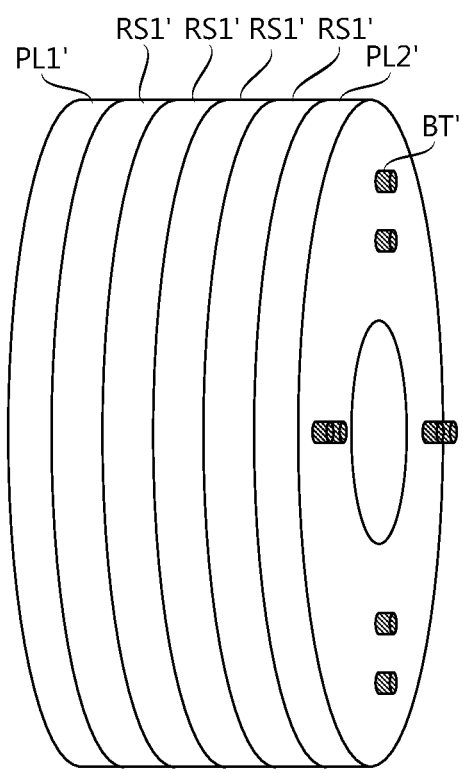
FIG. 5 shows an exemplary rotor including the rotor sheet stack of FIG. 4.

An exemplary rotor according to the present disclosure can include a rotor core having a plurality of rotor sheets stacked in an axial direction. FIG. 3 shows a rotor sheet RS1' of a rotor according to an exemplary embodiment. FIG. 4 shows four rotor sheets RS1' axially stacked. FIG. 5 shows a rotor including the rotor sheet stack of FIG. 4.

Rotor sheet RS1' includes flux guide sections FG1', FG2', FG3' and FG4' located along a circumferential direction of the rotor sheet RS1'. Each of the flux guide sections FG1'-FG4' includes flux paths P1', P2', P3' and P4' made of a material of high permeance and flux barriers B1', B2', B3' and B4' made of a material of low permeance. Flux paths and flux barriers are located alternately along radial direction of corresponding flux guide section.

In flux guide section FG1' none of flux barriers B1'-B4' has a bridge interrupting the flux barrier. Flux barrier B1' includes a magnet slot MS11' adapted to accommodate a permanent magnet M11', and flux barrier B2' includes a magnet slot MS12' adapted to accommodate a permanent magnet M12'. Each of the magnet slots is located in a centre of corresponding flux barrier such that a symmetry axis of the flux barrier bisects the magnet slot. Flux guide section FG3' is identical with flux guide section FG1'. Flux guide section FG3' is, for example, located π radians (180°) away from flux guide section FG1'.

In flux guide section FG2' a bridge BR21' interrupts the flux barrier B1', and a bridge BR22' interrupts the flux barrier B2'. In flux guide section FG4' a bridge BR41' interrupts the flux barrier B1', and a bridge BR42' interrupts the flux barrier B2'. Each of the bridges BR21', BR22', BR41' and BR42' is an intermediate bridge interrupting a corresponding flux barrier. Flux guide section FG4' is identical with flux guide section FG2'. Flux guide section FG4' is located, for example, π radians (180°) away from flux guide section FG2'.

In flux guide section FG2' magnet slot MS11' of flux guide section FG1' has been replaced by bridge BR21', and magnet slot MS12' of flux guide section FG1' has been replaced by bridge BR22.' Except for their middle portions flux guide sections FG1' and FG2' are identical with each other.

Bridges in flux guide sections FG2' and FG4' are positioned such that a quadrature axis of the rotor traverses them. Each of the bridges BR21', BR22', BR41' and BR42' is symmetrical with relation to corresponding quadrature axis.

The rotor sheet RS1' is symmetrical with relation to both a vertical line and a horizontal line, the vertical line coinciding with a quadrature axis bisecting flux guide section FG1', and the horizontal line coinciding with a quadrature axis bisecting flux guide section FG2'.

Rotor sheet RS1' can include more bridges close to the centre axis of the rotor sheet than further from the centre axis of the rotor sheet. The innermost flux barriers B1' have a total of two bridges. Flux barriers B2' also have a total of two bridges. The outermost flux barriers B3' and B4' do not have any bridges.

Rotor sheet RS1' can include a plurality of connection apertures. Each flux path P1' can include a connection aperture CA1', and each flux path P2' includes a connection aperture CA2'. The connection apertures are configured to receive bolts or bars for pressing rotor sheets of a stack together. Alternatively rotor sheets may be attached to each other by gluing, for example.

FIG. 4 shows a stack of four rotor sheets RS1', each one of the rotor sheets being similar with rotor sheet RS1' shown in FIG. 3. Successive rotor sheets are offset by, for example, π/2 radians (90°), wherein flux guide section FG1' of each inner rotor sheet is stacked between flux guide sections FG2' and FG4' of adjacent rotor sheets. Herein an inner rotor sheet is a rotor sheet which is axially located between two adjacent rotor sheets.

The rotor sheet stack of FIG. 4 can include permanent magnets M11' and M12'. Each of the permanent magnets M11' and M12' is an axial magnet located axially adjacent a corresponding bridge and configured to saturate the corresponding bridge. Each axial magnet M11' is located axially adjacent bridge BR41', and each axial magnet M12' is located axially adjacent bridge BR42'. Each of the axial magnets is configured to be axially pressed between two elements at least one of which is a bridge corresponding to the axial magnet.

In FIG. 4, a magnetization direction of one permanent magnet M11' is denoted with arrow MD11', and a magnetization direction of one permanent magnet M12' is denoted with arrow MD12'. Both magnetization direction MD11' and magnetization direction MD12' is parallel to an axial direction of the rotor sheet stack. Also, both magnetization direction MD11' and magnetization direction MD12' is substantially perpendicular to a direction in which corresponding bridge extends across associated flux barrier. For example, magnetization direction MD12' of axial magnet M12' is perpendicular to a direction in which bridge BR42' extends across flux barrier B2'. Permanent magnets located in the same flux barrier of the rotor sheet stack have the same magnetization direction such that a magnetic flux passes through permanent magnets located at a common axial line. Thus both permanent magnets M11' located in the flux barrier B1' have the same magnetization direction, and both permanent magnets M12' located in the flux barrier B2' have the same magnetization direction.

The stack of FIG. 4 includes axial magnets adjacent quadrature axis bridges. In an alternative embodiment there are axial magnets adjacent peripheral bridges too.

A rotor core including stacked rotor sheets may contain lateral magnets. Successive rotor sheets may have lateral magnets at different sides of corresponding bridges. For example, a lateral magnet adjacent a bridge in a rotor sheet is located clockwise with relation to the bridge and a lateral magnet adjacent a corresponding bridge in an adjacent rotor sheet is located anticlockwise with relation to the corresponding bridge.

FIG. 5 shows an exemplary rotor having the rotor sheet stack of FIG. 4. The rotor includes an end plate PL1' located at a first end of the rotor, and an end plate PL2' located at a second end of the rotor, and the rotor sheet stack of FIG. 4 stacked between the end plates PL1' and PL2'. Flux guide sections of the rotor core are formed by the plurality of flux guide sections FG1', FG2', FG3' and FG4' of the stacked rotor sheets RS1'.

Each of the axial magnets M11' and M12' in the rotor of FIG. 5 is pressed between two elements at least one of which is a bridge corresponding to the axial magnet. Each axial magnet that is located adjacent an end plate is pressed between the end plate and a bridge of an adjacent rotor sheet. Elements between which an axial magnet is located exert pressing forces on the axial magnet, the pressing forces keeping the axial magnet in position during rotation of the rotor.

Rotor sheets RS1' shown in FIG. 4 can, for example, be manufactured from a ferromagnetic plate by punching. A rotor sheet can be formed by a single punching process, wherein also the bridges of flux barriers are formed by the single punching process. A rotor core may include exclusively one type rotor sheets in which case the rotor sheets may be formed with one punching tool. The rotor sheets of one type may be automatically rotated for stacking.

In alternative exemplary embodiments rotor sheets of a rotor do not have to be identical with each other. Further, in embodiments where rotor sheets are identical, the rotor sheet used does not have to be symmetrical with relation to both a vertical line and a horizontal line, as the rotor sheet RS1'. In an exemplary embodiment a rotor core has a plurality of rotor sheets stacked in an axial direction, each of the plurality of rotor sheets including a plurality of flux guide sections located along circumferential direction of the rotor sheet, a plurality of flux guide sections of the rotor core being formed by the plurality of flux guide sections of the stacked rotor sheets. The plurality of flux guide sections of each of the plurality of rotor sheets includes a first flux guide section in which a first number of the plurality of flux barriers has an intermediate bridge, and a second flux guide section in which a second number of the plurality of flux barriers has an intermediate bridge, the first number being different than the second number.

In an exemplary embodiment a rotor core including lateral magnets has a plurality of rotor sheets stacked in an axial direction, the plurality of rotor sheets being arranged in a plurality of rotor sheet groups. Each rotor sheet group can include at least one rotor sheet, rotor sheets of each group being located successively to each other in the axial direction. Rotor sheets of each rotor sheet group are identical with each other. Also positions of rotor sheets in a rotor sheet group are identical, which means that each flux guide section in a rotor sheet group having more than one rotor sheet is located adjacent an identical flux guide section. In other words identical flux guide sections are aligned in a rotor sheet group while corresponding flux guide sections are offset by a predetermined angle α in adjacent rotor sheet groups. The predetermined angle α may be defined by an equation:

$$\alpha = \frac{2\pi}{N_{FGS}},$$

where $N_{FGS}$ is a number of flux guide sections in a rotor sheet. In exemplary embodiments, a number of flux guide sections in a rotor sheet is equal to the number of poles. The predetermined angle α is greater than half of an angle between adjacent poles.

Although FIG. 3 depicts a rotor sheet of a four pole rotor, any number of poles can be included. Further, although FIG. 3 depicts a rotor sheet of a synchronous reluctance machine any other types of machines can be configured with a rotor as disclosed herein as well.

The material of low permeance is selected on the basis of the type of the electric machine. In a reluctance motor the flux barriers may for example be filled with solid or powdery substances that are weakly conductive both as regards the magnetic flux and electricity. Exemplary substances include, depending on the embodiment, resins, plastics and carbon fibres. In some embodiments the material of low permeance may be air.

It will be apparent to those skilled in the art that the inventive concepts disclosed herein can be implemented in various ways. The disclosure and its embodiments are not limited to the examples described above but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A rotor for an electric machine comprising:
a rotor core having a plurality of flux guide sections located along a circumferential direction of the rotor core, each of the plurality of flux guide sections establishing a plurality of flux paths made of a material of high permeance and a plurality of flux barriers made of a material of low permeance located alternately along a radial direction of the flux guide section, each of the plurality of flux barriers extending from a first extremity to a second extremity, the first and the second extremities being situated adjacent a surface of the rotor core and being spaced apart from one another in a circumferential direction, each of the plurality of flux barriers defining a corresponding imaginary centre line extending from a first point on a rotor surface to a second point on a rotor surface, the first point and the second point being spaced apart from one another at the rotor surface in a circumferential direction of the rotor, the rotor core including:
a plurality of bridges made of a material of high permeance, each of the plurality of bridges extending across a corresponding flux barrier;
a plurality of permanent magnets, each one of which is located adjacent a corresponding bridge and configured to saturate the corresponding bridge, a magnetization direction of each of the plurality of permanent magnets diverging from a direction in which the corresponding bridge extends across the flux barrier; and a plurality of rotor sheets having stacked in an axial direction, each of the plurality of rotor sheets comprising a plurality of flux guide sections located along a circumferential direction of the rotor sheet, the plurality of flux guide sections of the rotor core being formed by the plurality of flux guide sections of the stacked rotor sheets, and the plurality of permanent magnets include at least one axial magnet located axially adjacent a corresponding bridge, each axial magnet being axially pressed between two elements at least one of which is a bridge corresponding to the axial magnet.

2. A rotor according to claim 1, wherein the magnetization direction of each of the plurality of permanent magnets is substantially perpendicular to the direction in which the corresponding bridge extends across the flux barrier.

3. A rotor according to claim 1, wherein a total volume of a permanent magnet corresponding to a bridge is not more than five times a volume of the bridge.

4. A rotor according to claim 1, wherein each flux barrier across which there extends at least one bridge having an associated permanent magnet has a length along the corresponding imaginary centre line which is multiple compared to a total length of said associated permanent magnet along the corresponding imaginary centre line.

5. A rotor according to claim 1, wherein the plurality of bridges comprises:
intermediate bridges each one of which interrupts a corresponding flux barrier.

6. A rotor according to claim 5, wherein at least part of the intermediate bridges are quadrature axis bridges, each quadrature axis bridge being positioned such that a quadrature axis of the rotor traverses the quadrature axis bridge.

7. A rotor according to claim 1, wherein the plurality of bridges comprises:
peripheral bridges, each peripheral bridge traversing corresponding flux barrier at an outer end of the flux barrier.

8. A rotor according to claim 1, wherein the plurality of flux guide sections of each of the plurality of rotor sheets comprises:
a first flux guide section in which a first number of the plurality of flux barriers has an intermediate bridge, and a second flux guide section in which a second number of the plurality of flux barriers has an intermediate bridge, the first number being different than the second number.

9. A rotor according to claim 1, wherein each of the plurality of rotor sheets comprises:
more bridges having an associated permanent magnet close to the centre axis of the rotor sheet than further from the centre axis of the rotor sheet.

10. An electric machine comprising:
a rotor and a stator, wherein the rotor of the electric machine is configured as a rotor according to claim 1.

11. A rotor according to claim 2, wherein a total volume of a permanent magnet corresponding to a bridge is not more than five times a volume of the bridge.

12. A rotor according to claim 11, wherein each flux barrier across which there extends at least one bridge having an associated permanent magnet has a length along the corresponding imaginary centre line which is multiple compared to a total length of said associated permanent magnet along the corresponding imaginary centre line.

13. A rotor according to claim 12, wherein the plurality of bridges comprises:
intermediate bridges each one of which interrupts a corresponding flux barrier.

14. A rotor according to claim 13, wherein the plurality of bridges comprises:
peripheral bridges, each peripheral bridge traversing corresponding flux barrier at an outer end of the flux barrier.

15. A rotor according to claim 14, wherein the plurality of flux guide sections of each of the plurality of rotor sheets comprises:
a first flux guide section in which a first number of the plurality of flux barriers has an intermediate bridge, and a second flux guide section in which a second number of the plurality of flux barriers has an intermediate bridge, the first number being different than the second number.

16. A rotor according to claim 15, wherein each of the plurality of rotor sheets comprises:
more bridges having an associated permanent magnet close to the centre axis of the rotor sheet than further from the centre axis of the rotor sheet.

17. An electric machine comprising:
a rotor and a stator, wherein the rotor of the electric machine is configured as a rotor according to claim 16.

* * * * *